United States Patent
Rostampour

(10) Patent No.: US 7,392,172 B2
(45) Date of Patent: Jun. 24, 2008

(54) PROVIDING VIRTUAL DEVICE ACCESS VIA FIRMWARE

(75) Inventor: Arad Rostampour, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 440 days.

(21) Appl. No.: 11/116,564

(22) Filed: Apr. 28, 2005

(65) Prior Publication Data

US 2006/0248526 A1    Nov. 2, 2006

(51) Int. Cl.
*G06F 9/455* (2006.01)
*G06F 13/00* (2006.01)

(52) U.S. Cl. .............. 703/26; 703/25; 703/27; 718/1; 718/104

(58) Field of Classification Search ............ 703/22, 703/27, 25, 26; 718/104, 105, 1
See application file for complete search history.

(56) References Cited

U.S. PATENT DOCUMENTS

| | | | |
|---|---|---|---|
| 5,812,820 A | 9/1998 | Loram | |
| 6,357,003 B1 | 3/2002 | Zarrin et al. | |
| 6,401,183 B1 | 6/2002 | Rafizadeh | |
| 6,668,374 B1 | 12/2003 | Sten et al. | |
| 6,760,804 B1 | 7/2004 | Hunt et al. | |
| 2005/0132365 A1* | 6/2005 | Madukkarumukumana et al. | 718/1 |
| 2006/0010450 A1* | 1/2006 | Culter | 718/104 |

OTHER PUBLICATIONS

U.S. Appl. No. 11/116,556, filed Apr. 28, 2005, Rostampour.
Developer's Interface Guide for 64-bit Intel Architecture-based Servers, DIG64 Version 2.1, Jan. 2002, DIG64 Promoters, 128 pages, USA.
DIG64 Discriptions for Headless Console & Debug Port Devices, Version 1.0a, Mar. 2002, 8 pages, USA.
Intel Itanium Processor Family System Abstration Layer Specification, Dec. 2003, Document No. 245359-007, 126 pages, USA.

* cited by examiner

*Primary Examiner*—Thai Phan

(57) ABSTRACT

Hardware access is provided for an operating system by allocating a portion of firmware address space of a data processing arrangement for use as a virtualized data interface that emulates a first hardware device. The virtualized data interface is presented to the operating system. The operating system accesses the virtualized data interface using a standardized kernel component of the operating system adapted to interface with the first hardware device. Data is exchanged between the virtualized interface and a second hardware device based on accesses of the virtualized data interface by the operating system via the standardized kernel component.

30 Claims, 6 Drawing Sheets

US 7,392,172 B2

PROVIDING VIRTUAL DEVICE ACCESS VIA FIRMWARE

FIELD OF THE INVENTION

The present disclosure relates to data processing, and in particular to providing access to virtual devices using firmware runtime services.

BACKGROUND

Modern personal computers (PC) have benefited from many technological innovations over the past decades. Performance gains have been achieved by increasing processor speed, as well as increasing data transfer speed over input-output (I/O) busses. The progress in I/O speeds has largely come about through the implementation of new interface standards, although backwards compatibility has required that many legacy interfaces still be included on PCs.

In the "x86" processor architecture, the original standard I/O interfaces included serial and parallel ports for external peripherals, the Industry Standard Architecture (ISA) bus for plug-in cards, and the Integrated Drive Electronics (IDE) interface for floppy disk and hard drives. Modern PCs may still contain some of these interfaces, but there has been a steady transition to Universal Serial Bus (USB) and IEEE 1394 for external peripherals, Peripheral Component Interconnect (PCI) bus for cards, and Enhanced IDE and AT Attachment (ATA) hard drives. Other specialized interfaces have been developed for various hardware and environments, such as Personal Computer Memory Card International Association (PCMCIA) devices for portable computers and Advanced Graphic Processor (AGP) bus interfaces for video cards.

Even with these advances in computer I/O standards, the operating system may still need access to a well-known, generic interface. These generic interfaces represent a lowest common denominator that can safely be used under a number of circumstances. For example, some versions of the Windows™ and Unix™ kernels allow access to the operating system via a terminal device. Historically, these terminal devices were "dumb" terminals that connected to a serial port of the computer. Certain critical tasks such as kernel message logs can be directed to this terminal (also referred to as the "console"). These terminals may be used for system inputs, such as providing a login for user access or inputs to a kernel debugger.

A dumb terminal is usually connected to a Universal Asynchronous Receiver-Transmitter (UART) of the host machine. The UART sends and receives data over serial transmission lines. The UART serializes outgoing data and assembles incoming serial data into bytes and places those bytes in a buffer. Although many commonly used UARTs communicate asynchronously on the transmission lines, similar devices exist that communicate synchronously, e.g., where both communicating devices are synched to a clock signal.

An operating system may also require other lowest common denominator devices, such as keyboards, mice, and displays. In a data center environment it may not be practical to provide each of these actual devices for each computer, along with the associated connectors and power supplies that may be required by such devices. Including additional hardware with the computing systems increases costs, space required, and power consumption. In many densely packed data centers, all three of these factors are at a premium. Therefore, it is desirable to provide a way to provide legacy device access on a computer without increasing hardware size, cost, and power consumption.

SUMMARY

Hardware access is provided for an operating system by allocating a portion of firmware address space of a data processing arrangement for use as a virtualized data interface that emulates a first hardware device. The virtualized data interface is presented to the operating system. The operating system accesses the virtualized data interface using a standardized kernel component of the operating system adapted to interface with the first hardware device. Data is exchanged between the virtualized interface and a second hardware device based on accesses of the virtualized data interface by the operating system via the standardized kernel component.

DETAILED DESCRIPTION

Figure 1:
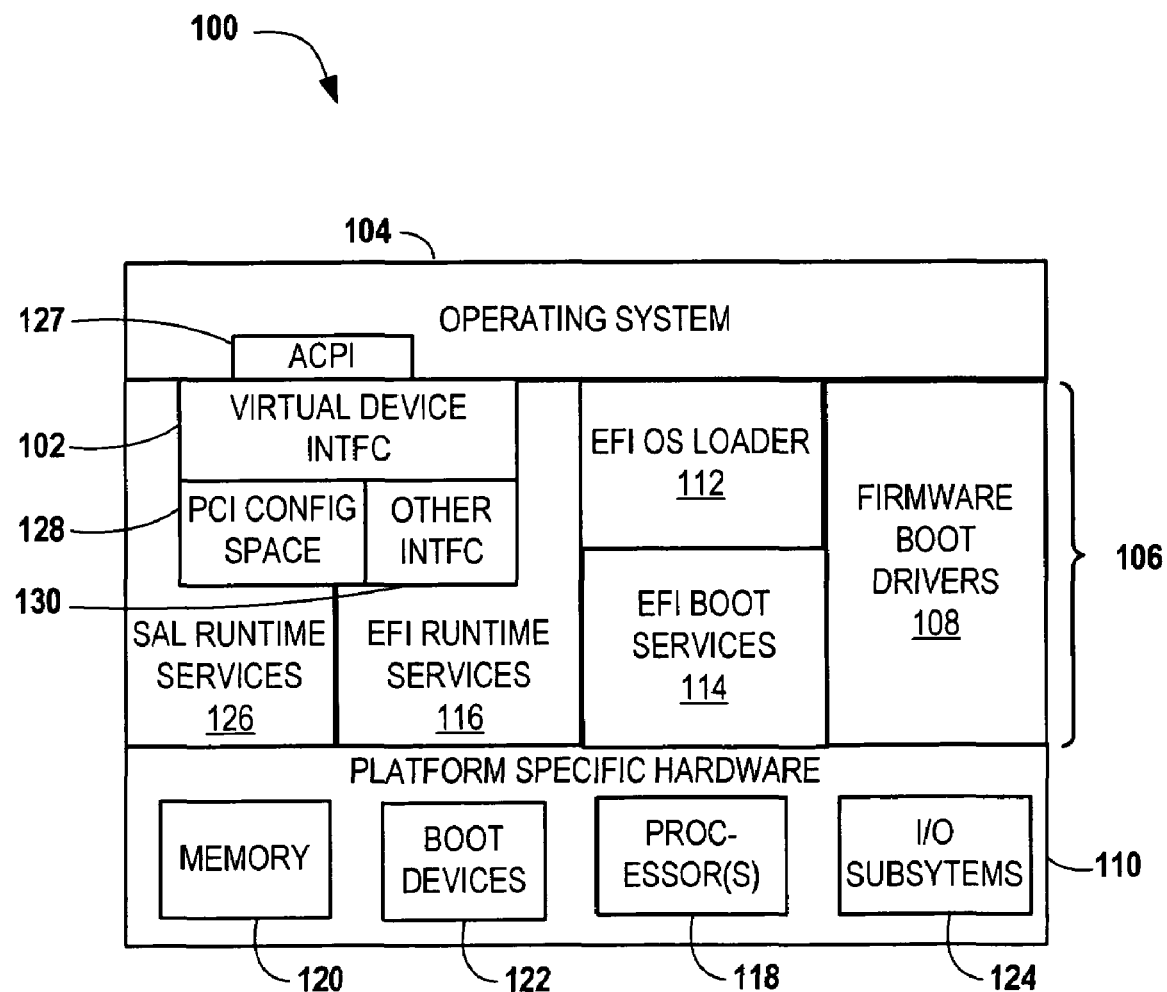
FIG. 1 illustrates a software architecture configured for providing a virtual device access according to embodiments of the present invention.

In the following description of various embodiments, reference is made to the accompanying drawings which form a part hereof, and in which is shown by way of illustration various example manners by which the invention may be practiced. It is to be understood that other embodiments may be utilized, as structural and operational changes may be made without departing from the scope of the present invention.

In general, the present disclosure relates to emulating a hardware interface using firmware runtime services. The hardware may be emulated using PCI configuration space access provided by firmware. In certain architectures, the PCI configuration space may be accessed by abstraction layers in firmware. In this way, operating systems and other software can access PCI device configuration without requiring direct hardware access (e.g., writing to I/O address space). This also makes it possible to implement virtual PCI devices, because the PCI configuration space can be manipulated in firmware. So, for example, a virtual serial communications port that satisfies minimal system requirements can be implemented in firmware. The virtual serial port can be configured to transfer the serial data using a different type of communications channel, or may act as a placeholder (e.g., a "bit bucket") to ensure the system meets the minimum hardware requirements of the OS.

It will be appreciated that many computing systems can benefit by utilizing emulated device interfaces. In particular, systems that require a plurality of standardized interfaces may benefit from this approach. Standardized interfaces may include interfaces that conform to well known data and protocol configurations, such as serial ports, parallel ports, keyboards, displays, storage, networking etc. These standardized interfaces may be accessed by standardized kernel components, including standardized device drivers, direct kernel accesses, and the like. Standardized device drivers include legacy drivers that may be used without modification with an emulated interface. The standardized drivers may also include specialized drivers that adopt the behaviors of a legacy driver, but are written to specifically take advantage of emulated or virtualized standard hardware interfaces. It will be appreciated that the emulated device interface may use any combination of standardized kernel components known in the art.

One type of system that may benefit from virtualized interfaces includes partitionable systems. A partitionable system consists of nodes (or cells) where the partitions are subsystems allocated to independent jobs. A partitionable system may include a single system that has multiple OS images running, and/or may include multiple computers running in a single complex/rack. Each partition in such a system runs a fault-contained instance of a potentially different operating system. Each active partition may require a minimal set of hardware, such as serial ports, video, keyboard, mouse, network interface, etc.

In a partitioned system, it may become difficult to assign actual devices to each partition. The space, power, and cost required to include separated devices for each partition of a partitioned system may make some implementations impractical. This is especially true where partitions can be manually or automatically reassigned or reconfigured. Nonetheless, there are many advantages to providing legacy device access to partitioned systems and similar computing arrangements. These advantages include compatibility and reliability. In some cases, the OS can utilize an existing legacy driver to access the virtual device, thereby precluding the need for special device drivers, additional hardware, and/or specialized hardware.

In reference now to FIG. 1, a computing architecture 100 is shown utilizing a virtual device interface 102 according to embodiments of the present invention. The computing architecture 100 in this example includes an operating system (OS) 104 that interacts with firmware 106. The OS may be any OS known in the art, including Windows™, Linux™, Unix™, Mac OS™, and the like. The firmware 106 is often included as a read-only memory (ROM) or erasable programmable ROM (EPROM) chip designed to interoperate with particular platform-specific hardware 110. The firmware 106 can also be relocated and run from system random access memory (RAM), and can be loaded from disk and run from RAM as well. The firmware 106 may include boot drivers 108 to facilitate accessing various parts of the platform specific hardware 110 during boot-time of the OS 104.

The firmware 106 may also include an interface such as defined in the Extensible Firmware Interface (EFI) specification. EFI defines a generic and extensible standard for interfacing between the OS 104 and the hardware 110. The EFI layer in this example includes an OS loader 112, boot services 114 and runtime services 116. The OS loader 112 is a piece of software that uses standardized boot and runtime services 114, 116 to load the OS 104. The EFI boot services 114 abstracts devices into device "handles" and "protocols" for use during boot time. This abstraction allows a legacy OS loader (e.g., legacy BIOS code) to be reused without the end-user of the device having to worry about the underlying implementation. The EFI run-time services 116 also provide an abstraction of underlying hardware resources for use by the OS 104 during run-time.

Other abstraction layers may also reside in firmware 106. For example, the Itanium™ architecture defines a system abstraction layer (SAL) in addition to the EFI. The SAL encapsulates features that are unique to the platform specific hardware 110 and present those features in a generic interface. In particular, SAL abstracts the hardware 110 besides the processor 118. Hardware 110 accessible by SAL may include memory 120, boot devices (e.g., hard disks) 122, and input-output (I/O) subsystems 124. In particular, SAL provides access to PCI configuration space 128 of the computing architecture 100.

The illustrated firmware 106 includes a SAL runtime services module 126. This module 126 provides runtime service routines that encapsulate hardware functionality for the OS 104 while it is running (e.g., post-boot). EFI boot and runtime services 114, 116 may also interface with SAL runtime services 126. The OS 104 may call procedures of the SAL runtime services 126 to access platform specific hardware, and in particular PCI configuration space 128. The SAL runtime services module 126 is designed so accesses to hardware via SAL take no more time than via the OS 104 directly.

Not all hardware access by the OS 104 need be via SAL 126 or EFI. For example, the Advanced Configuration and Power Interface (ACPI) 127 is an industry-standard interface for OS-directed configuration on computing arrangements. ACPI provides a well-defined interface specification that provides configuration, definition, and device discovery of system hardware, including PCI hardware.

The SAL runtime services 126, EFI runtime services 116, and/or ACPI 127 may be used to present a virtual device interface 102 to the OS 104 and related software using the PCI configuration space 128. The virtual device interface 102 generally emulates the behavior of a standardized device, although it may emulate a non-standard device as well. The standardized device emulated by the virtual device interface 102 is typically a simple, legacy device that is well supported in the OS 104, such as a UART, video display, keyboard, etc.

Data transfers conducted at virtual device interface 102 may be relayed to one or more physical data transfer devices. Similarly, data exchanged with multiple virtual device interfaces 102 may be multiplexed onto a single data transfer device. The data transfer device may be any device that fulfills system requirements. For example, if it is desired to remotely exchange data with the virtual device interface 102, a network card may be utilized as the data transfer device for purposes of remotely transferring the data. If it is desired to locally store the virtual device interface 102 output data, a hard disk or other local storage may act as the data transfer device.

Devices such as network cards are connected to the processor(s) 118 by way of an I/O bus. One commonly used I/O bus is the Peripheral Component Interconnect (PCI). PCI is a local bus standard that is incorporated in most modern general-purpose computers. PCI may be implemented in any processor architectures now known or later developed, including Intel® x86, x86-64, Itanium, EM64T, AMD64, Alpha, PowerPC™, ARM, MIPS, etc. The PCI bus facilitates high-speed data exchanges between the processor and locally connected peripheral devices.

A single PCI device may provide up to eight separate functions. These functions are separately addressable in the device's configuration space, an example of which is represented as the PCI configuration space 128. Configuration space 128 refers to a block of memory locations maintained by each device for identification, initialization, and control.

PCI compatible devices (except for host/bus bridges) implement PCI configuration space 128. The PCI specification defines a set of registers that are implemented in a portion of configuration space 128 known as the configuration header. These registers contain values such as Device ID, Vendor ID, Class Code, etc.

In the x86 architecture, PCI configuration space 128 is accessed using two 32-bit ports located in I/O address space. In architectures that utilize SAL an alternate mechanism is used to access PCI configuration space 128. The SAL specification involves accessing PCI configuration space 128 using SAL procedure calls, such as provided by SAL runtime services 126. In such systems, the PCI configuration space 128 should not be accessed using the I/O ports because of asynchronous events may occur that make the accesses unreliable. Access to PCI configuration space 128 may also be provided by firmware services such as EFI runtime services 116 and ACPI 127.

It will be appreciated by those skilled in the art that the PCI configuration space 128 is only one example of a hardware interface that may be used for implementing the virtual device interface 102. A virtual device interface 102 may be written to take advantage of any other special or general-purpose hardware I/O interface now known or later developed, as represented by the other interface 130. Generally, any hardware interface that supports emulating a device in firmware may be used to provide the virtual interface 102.

Figure 2:
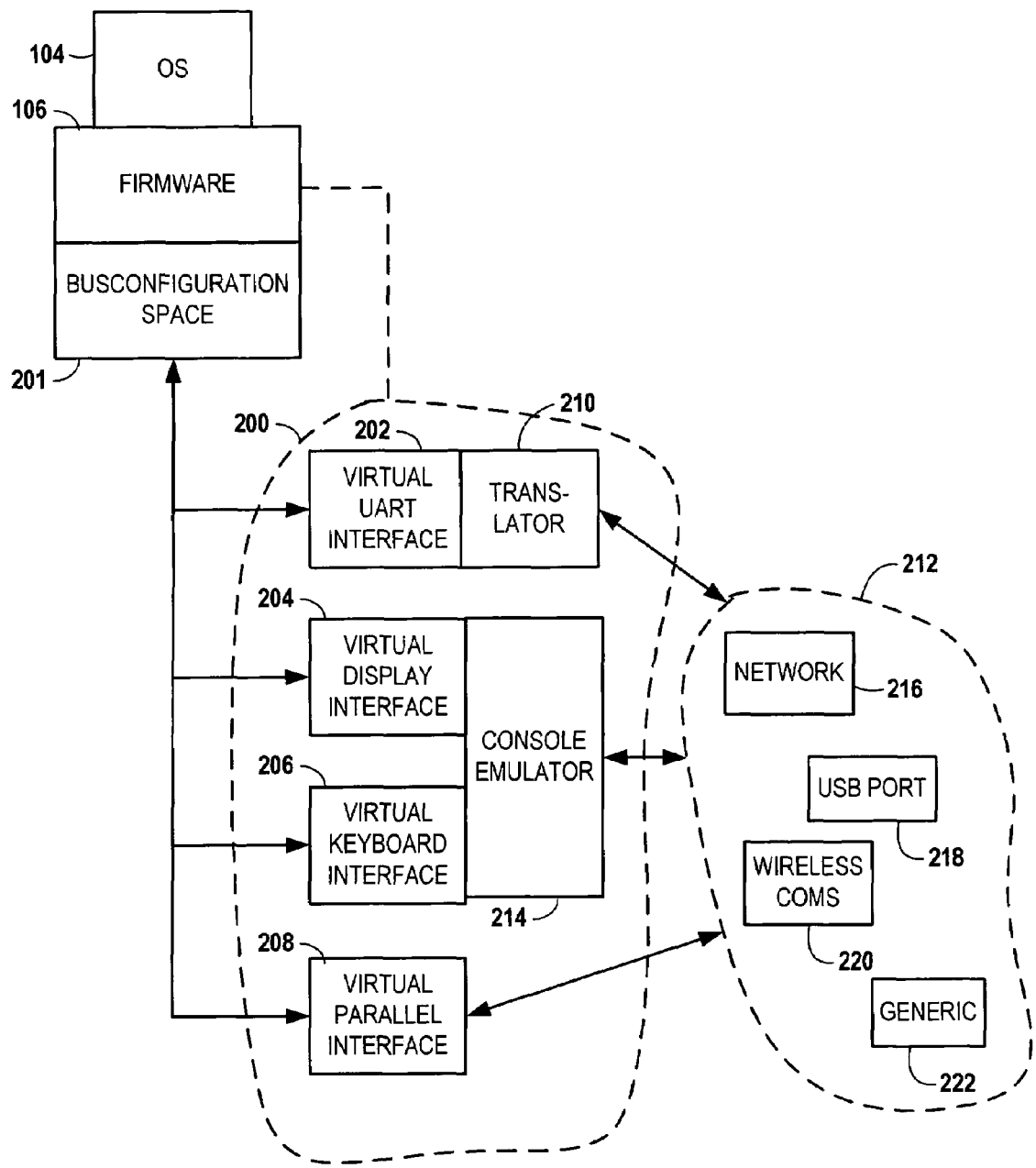
FIG. 2 illustrates virtual device interfaces implemented in bus configuration space according to embodiments of the present invention.

One advantage in providing the virtual device interface 102 in firmware 106 is that systems developers can provide simulated device access to the OS 104 without having to provide the actual hardware emulated by the interface 102. FIG. 2 shows an example of devices emulated in firmware 106 according to embodiments of the present invention. In this example, a number of virtual device interfaces 200 are provided via a bus configuration space 201. The illustrated virtual device interfaces 200 include a virtual UART interface 202, a virtual display interface 204, a virtual keyboard interface 206, and a virtual parallel port interface 208. Each of these interfaces 200 may represent legacy interfaces that may not be practical to include in hardware, but may be needed by the OS 104. For example, the virtual UART, display, and keyboard interfaces 202, 204, and 206 may be used for purposes of logging, debugging, and control. The virtual parallel interface 208 may be used to emulate a line printer or other printing/logging device.

The firmware 106 may also include other software that manipulates data and states associated with the interfaces 200. For example, the virtual UART interface 202 may utilize a translator module 210 that formats, assembles, and synchronizes data for communication over one or more data transfer devices 212. Similar modules may be used for translating data communicated via one of the interfaces 200. For example, the virtual display and keyboard interfaces 204, 206 may be coupled to a console emulator module 214 that handles the appropriate input and outputs for the two interfaces 204, 206 combined.

The virtual interfaces 200 may be arranged to communicate with any type of data transfer devices 212. The devices 212 may be locally attached (e.g., on-board) or remotely attached. Such devices 212 may include network cards/chips 216, USB ports 218, wireless communications devices 220, or any other data exchange/communications/storage device known in the art, as represented by generic device 222.

Figure 3:
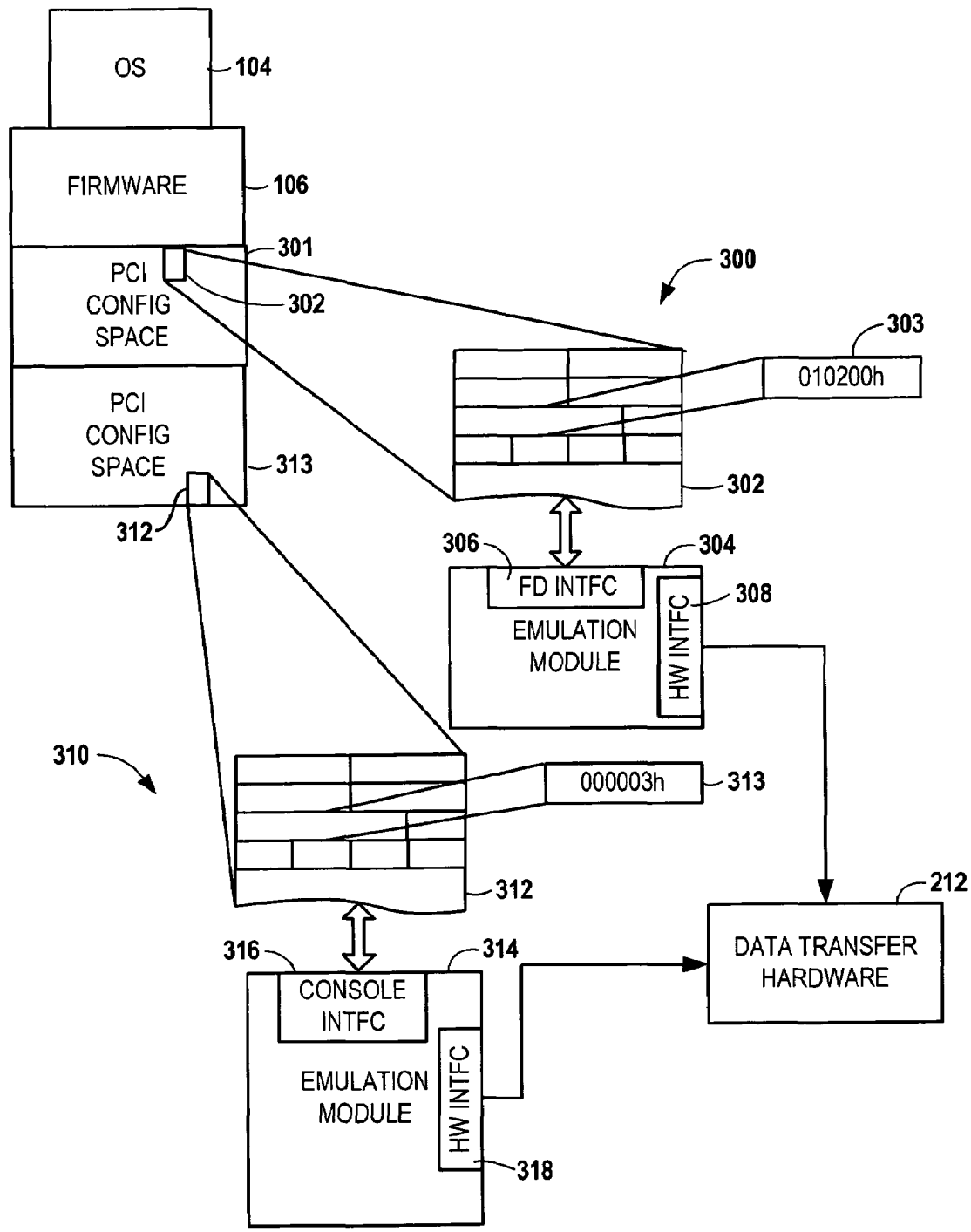
FIG. 3 illustrates details of virtual device interfaces implemented in PCI configuration space according to embodiments of the present invention.

Particular implementation details of virtual device interfaces according to embodiments of the present invention are illustrated in FIG. 3. One example virtual interface 300 is arranged to emulate a floppy drive in a PCI configuration space 301. Such an interface 300 may be required, for example, to update system data such as drivers and BIOS images. The interface 300 includes a PCI configuration header 302 in the PCI configuration space 301. The header 302 includes a class code register 303 that is used in the PCI configuration header 302. The class code register 303 is set to, for example, 010200h, which is a pre-defined value specified in the PCI specification to represent a floppy drive. Other registers of the configuration header 302 will also be set appropriately for a floppy drive device.

The virtual interface 300 includes an emulation module 304. The emulation module 304 includes a floppy drive interface 306 that is configured to present the configuration header 302 as a floppy device, as well as performing PCI data transfers in a manner appropriate for such a device. A hardware interface 308 is configured for exchanging data with data transfer hardware 212. The emulation module 304 couples the floppy drive interface 306 with the hardware interface 308 so that the OS 104 "sees" the data transfer hardware 212 as a floppy drive.

A second example virtual interface 310 is arranged to emulate a console (e.g., a UART). Such an interface 310 may be used, for example, by a console application running on the OS 104. This interface 310 utilizes a second header 312 in a PCI configuration space 313. The class code register 313 is set to the appropriate value as defined in the PCI specification. An emulation module 314 handles communications between the console interface 316 on the PCI-side and a hardware interface 318. The hardware interface 318 is configured to communicate with the data transfer hardware 212.

The virtual interfaces 300 and 318 presented in FIG. 3 are only example interfaces that may be implemented according to embodiments of the present invention. It will be appreciated that any type of hardware interface may be virtualized using the concepts described herein. Such hardware interfaces may include keyboards, mice, trackballs, joysticks, tablets, processors, modems, hard drives, optical drives, solid state memory, network interfaces, sound, video, cameras, tape drives, etc.

In addition, the virtualized interfaces 300 and 318 may be implemented using PCI enumeration of a non-standard device. For example, where a system that has multiple partitions divided by firmware, a single device (e.g., a console) may be shared among the partitions by presenting each OS with a virtualized UART in PCI-configuration space. The OS can be changed in a standard way (e.g., with a modified driver) to use the PCI configuration space in the same manner the OS can use I/O ports or memory-mapped I/O. This can be accomplished using very little code change and without requiring device specific knowledge. This implementation also provides the advantages that the OS can access the virtualized devices without having to make the OS understand new application program interfaces or having OS-specific drivers that multiplex the console.

Figure 4A:
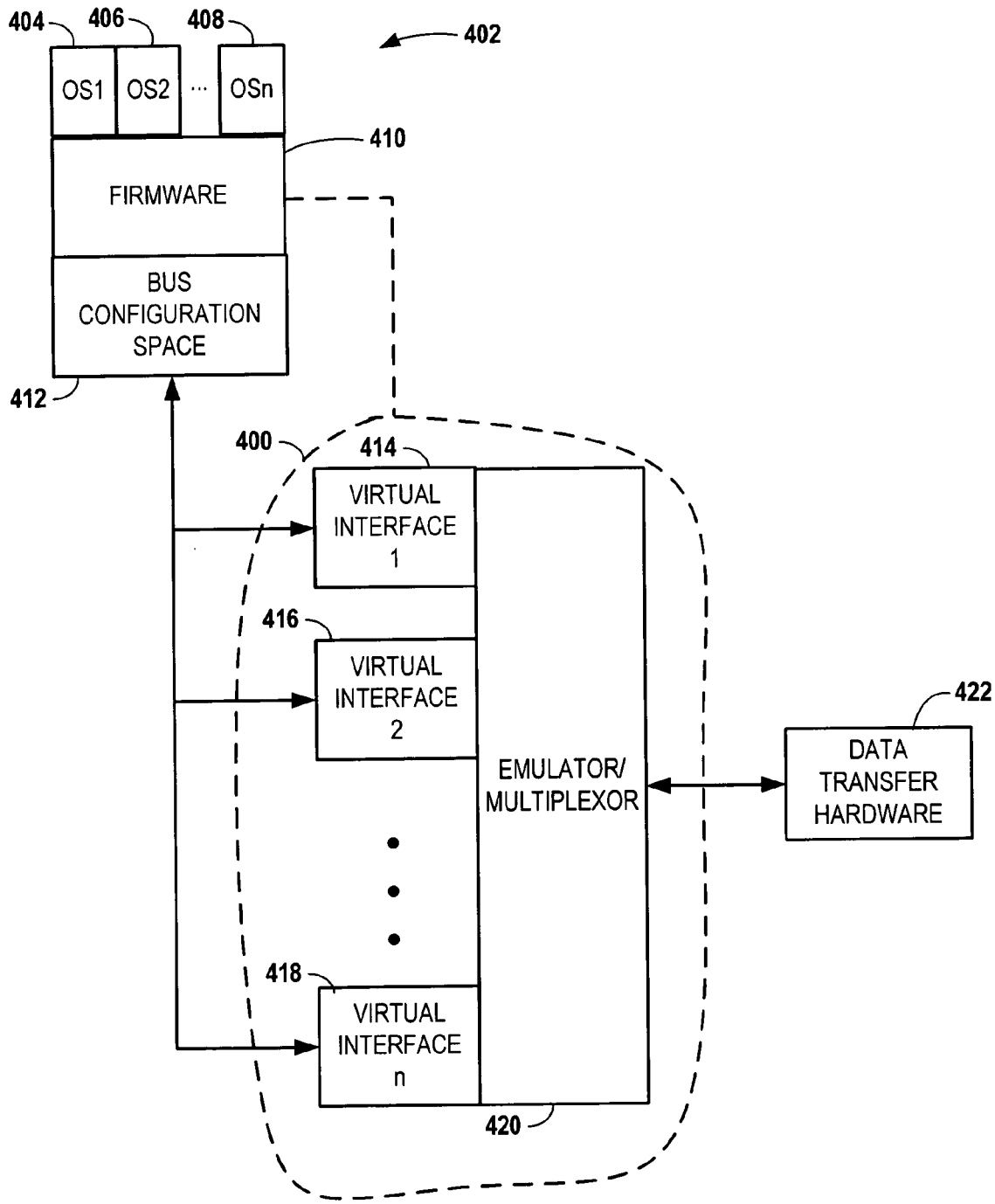
FIG. 4A illustrates multiplexing outputs from multiple operating systems on a single partition using virtual device interfaces according to embodiments of the present invention.

The example in FIG. 3 shows two different virtual interfaces 300, 310 being presented to a single operating system and used to access a single hardware device 212. In other arrangements, it may be desirable to use many similar or identical virtual interfaces to access one or more devices. One such arrangement is shown in FIG. 4A, which illustrates multiple virtual device interfaces 400 used on a partitionable computing arrangement 402 according to embodiments of the present invention.

The computing arrangement 402 is capable of running a plurality of operating systems, as represented by OSes 404, 406, and 408. The OSes 404, 406, and 408 have access to firmware 410 that provides a bus configuration space 412.

The bus configuration space 412 provides virtual interfaces 414, 416, and 418 which may each be associated with the OSes 404, 406, and 408, respectively. The virtual interfaces 414, 416, and 418 may be substantially similar or identical. For example, the virtual interfaces 414, 416, and 418 may represent virtual UARTs that each may or may not conform to the same UART specification (e.g., 16550, 8250).

An emulator/multiplexer module 420 is capable of exchanging data via all of the virtual interfaces 414, 416, and 418, and communicating that data to data transfer hardware 422. The emulator/multiplexer 420 may be configured to emulate the performance of a device presented by the virtual interfaces 414, 416, and 418 and control disposition of data (e.g., multiplexing/demultiplexing) between the data transfer hardware 422 and the multiple interfaces 414, 416, and 418. For example, the arrangements may be used to transfer debug data of the operating systems 404, 406, and 408 via virtualized UART interfaces 414, 416, and 418, and multiplex that data to one or more data transfer devices 422 such as network cards.

Figure 4B:
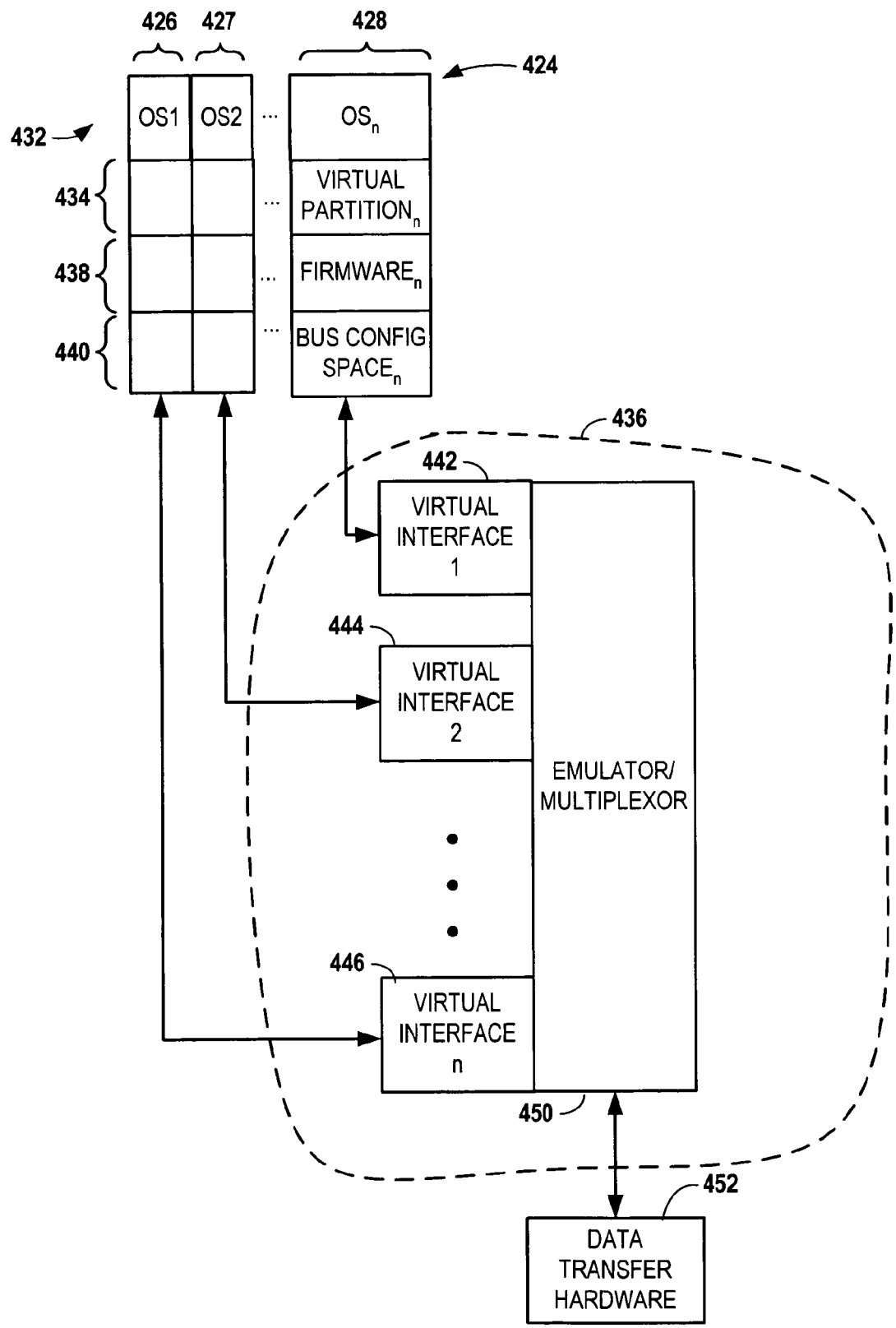
FIG. 4B illustrates multiplexing outputs from multiple partitions using virtual device interfaces according to embodiments of the present invention.

The virtualized UART interfaces 414, 416, and 418 shown in FIG. 4A may service multiple OS images 404, 406, and 408 that run in a single partition. An alternate arrangement 424 according to embodiments of the invention is shown in FIG. 4B. The computing arrangement 424 includes multiple partitions 426, 427, and 428. The partitions each include OS images 432, virtual partitions 434, firmware 438, and configuration space 440. The multiple OS images 432 each run independently in the respective partitions 426, 427, and 428.

Each virtual partition 434 may include its own boot disk, its own CPUs, its own LAN connection, and a sufficient subset of memory to run the OS 432 and applications hosted on that virtual partition 434. A virtualized UART interface 436 is included in the arrangement, and may be implemented the firmware 438 and configuration space 440 of each partition 426, 427, and 428 as described above in relation to FIG. 4A.

The bus configuration spaces 440 provide virtual interfaces 442, 444, and 446 that may each be associated with OS images 432 of the partitions 426, 427, and 428. The virtual interfaces 442, 444, and 446 may be substantially similar or identical. The virtual interfaces 442, 444, and 446 may present a virtualized PCI enumeration of a standard or non-standard device. Similar to the arrangement illustrated in FIG. 4A, the computing arrangement 424 of FIG. 4B includes an emulator/multiplexer module 450 that is capable of exchanging data with some or all of the virtual interfaces 442, 444, and 446, and communicating that data to data transfer hardware 452.

Figure 5:
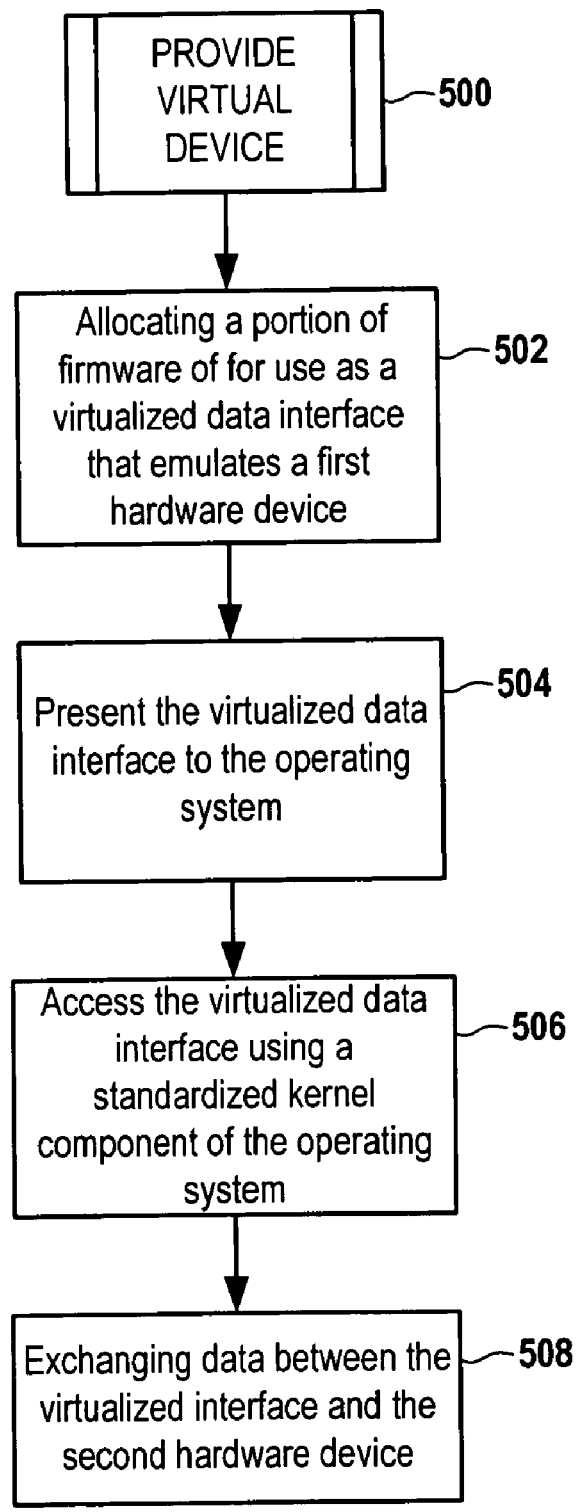
FIG. 5 illustrates a procedure for providing a virtual device access according to embodiments of the present invention.

In reference now to FIG. 5, a procedure 500 is illustrated for providing virtual device access using firmware runtime services according to embodiments of the present invention. A portion of firmware of a data processing arrangement is allocated (502) for use as a virtualized data interface that emulates a first hardware device. The first hardware device may be any device, particularly a device that may be accessed using standardized kernel components of an OS. The virtualized data interface is presented (504) to the operating system. For example, the virtualized interface may be set up in PCI configuration space. The virtualized data interface is then accessed (506) using a standardized kernel component (e.g., a device driver) of the operating system. Data is exchanged (508) between the virtualized interface and the second hardware device. This exchange (508) is typically due to accesses of the virtualized data interface by the operating system It will be appreciated that processor-based instructions for implementing embodiments of the invention are capable of being distributed in the form of a computer readable medium of instructions and a variety of other forms. The description herein of such processor-based instructions apply equally regardless of the particular type of signal bearing media actually used to carry out the distribution. Examples of computer readable media include media such as EPROM, ROM, tape, paper, floppy disc, hard disk drive, RAM, and CD-ROMs and transmission-type media such as digital and analog communications links.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description, but rather the scope of the invention is defined by the claims appended hereto.

What is claimed is:

1. A processor-based method of providing hardware access for an operating system, comprising:
   allocating a portion of firmware address space of a data processing arrangement for use as a virtualized data interface that emulates a first hardware device;
   presenting the virtualized data interface to the operating system;
   accessing the virtualized data interface using a standardized kernel component of the operating system (OS) adapted to interface with the first hardware device; and
   exchanging data between the virtualized interface and a second hardware device based on access of the virtualized data interface by the operating system via the standardized kernel component, wherein the exchanging of data provides simulated access for the OS to the first hardware device without the first hardware device being present, and the second hardware device is a type different from the first hardware device.

2. The method of claim 1, wherein allocating the portion of firmware address space comprises allocating a portion of PCI configuration space.

3. The method of claim 1, wherein accessing the virtualized data interface comprises accessing the virtualized data interface via a Systems Abstraction Layer (SAL).

4. The method of claim 1, wherein accessing the virtualized data interface comprises accessing the virtualized data interface via an Extensible Firmware Interface (EFI).

5. The method of claim 1, wherein accessing the virtualized data interface comprises accessing the virtualized data interface via an Advanced Configuration and Power Interface (ACPI).

6. The method of claim 1, wherein the first hardware device comprises at least one of a UART, a keyboard, a persistent storage device, a network interface, and a video display.

7. The method of claim 1, wherein exchanging data between the virtualized interface and the second hardware device comprises exchanging data between the virtualized interface and at least one of a networking card and an external data bus adapter.

8. The method of claim 1, wherein presenting the virtualized data interface to the operating system comprises presenting a virtualized PCI enumeration of a non-standard device.

9. A processor-readable medium, comprising:
   a program storage device configured with instructions for causing a processor of a data processing arrangement to perform the operations of,
      allocating a portion of firmware of the data processing arrangement for use as a virtualized data interface that emulates a first hardware device;

presenting the virtualized data interface to the operating system;

accessing the virtualized data interface using a standardized kernel component of the operating system (OS) adapted to interface with the first hardware device; and exchanging data between the virtualized interface and a second hardware device based on access of the virtualized data interface by the operating system via the standardized kernel component, wherein the exchanging of data provides simulated access for the OS to the first hardware device without the first hardware device being present, and the second hardware device is a type different from the first hardware device.

10. The processor-readable medium of claim 9, wherein allocating the portion of firmware address space comprises allocating a portion of PCI configuration space.

11. The processor-readable medium of claim 9, wherein accessing the virtualized data interface comprises accessing the virtualized data interface via a Systems Abstraction Layer (SAL).

12. The processor-readable medium of claim 9, wherein accessing the virtualized data interface comprises accessing the virtualized data interface via an Extensible Firmware Interface (EFI).

13. The processor-readable medium of claim 9, wherein accessing the virtualized data interface comprises accessing the virtualized data interface via an Advanced Configuration and Power Interface (ACPI).

14. The processor-readable medium of claim 9, wherein the first hardware device comprises at least one of a UART, a keyboard, a persistent storage device, a network interface, and a video display.

15. The processor-readable medium of claim 9, wherein the second hardware device comprises at least one of a networking card and an external data bus adapter.

16. The processor-readable medium of claim 9 wherein presenting the virtualized data interface to the operating system comprises presenting a virtualized PCI enumeration of a non-standard device.

17. An apparatus comprising:
a portion of firmware of a data processing arrangement used as a virtualized data interface that emulates a first hardware device;
means for presenting the virtualized data interface to the operating system;
means for accessing the virtualized data interface using a standardized kernel component of the operating system (OS); and
means for exchanging data between the virtualized interface and a second hardware device based on access of the virtualized data interface by the operating system via the standardized kernel component, wherein the exchanging of data provides simulated access for the OS to the first hardware device without the first hardware device being present, and the second hardware device is a type different from the first hardware device.

18. An apparatus, comprising:
a bus interface configured to provide access to data exchange devices of the apparatus;
a data exchange device configured to exchange data with the bus interface;
a processor coupled to the bus interface and the data exchange device; and
firmware having instructions that cause the processor to, present, to an operating system (OS) of the apparatus, a virtual device interface in a configuration space of the bus interface; and
exchange data between the virtual device interface and the data
exchange device in response to accesses of the virtual device interface by the operating system via a standardized kernel component of the operating system,
wherein the standardized kernel component is configured to access a hardware device, the exchange of data provides simulated access for the OS to the hardware device without the hardware device being present, and the data exchange device is a type different from the hardware device.

19. The apparatus of claim 18, wherein the bus interface comprises a PCI interface.

20. The apparatus of claim 18, wherein the firmware is compliant with the System Abstraction Layer (SAL) specification.

21. The apparatus of claim 18, wherein the firmware is compliant with the Extensible Firmware Interface (EFI) specification.

22. The apparatus of claim 18, wherein the instructions cause the processor to present the virtual device interface to the operating system via an Advanced Configuration and Power Interface (ACPI).

23. The apparatus of claim 18, wherein the virtual device interface is configured to emulate at least one of a UART, a keyboard, a persistent storage device, a network interface, and a video display.

24. The apparatus of claim 18, wherein the data exchange device comprises a network interface device.

25. The apparatus of claim 18, wherein the processor architecture is capable of utilizing firmware runtime services.

26. The apparatus of claim 25, wherein the processor comprises at least one of an Itanium-compatible processor, an x86 compatible processor, and an x86-64 compatible processor.

27. The apparatus of claim 18, wherein the standardized kernel component comprises a device driver.

28. The apparatus of claim 27, wherein the device driver comprises a legacy device driver.

29. The apparatus of claim 18, wherein the firmware has instructions that cause the processor to present the virtualized data interface to the operating system using a virtualized PCI enumeration of a non-standard device.

30. An apparatus, comprising:
a bus interface configured to provide access to data exchange devices of the apparatus;
a data exchange device configured to exchange data between the apparatus an entity external to the apparatus;
a processor coupled to the bus interface and the data exchange device; and
firmware having instructions that cause the processor to,
present, to a plurality of operating systems (OSs) of the apparatus via a configuration space of the bus interface, a plurality of virtual device interfaces each associated with an operating system of the plurality of operating systems; and
multiplex data between the virtual device interfaces and the data exchange device in response to accesses of the virtual device interfaces by the associated operating system via standardized kernel components of the operating systems, wherein each standardized kernel component is configured to access a hardware device, the multiplexing of data provides simulated access for each OS to the hardware device without the hardware device being present, and the data exchange device is a type different from the hardware device.

* * * * *